United States Patent [19]
Erdman et al.

[11] 3,797,214
[45] Mar. 19, 1974

[54] MOWER DISCHARGE CHUTE DEFLECTOR AND BAGGING ATTACHMENT

[75] Inventors: Leon Paul Erdman, Beaver Dam; Lee Joseph Wanie, Horicon, both of Wis.

[73] Assignee: Deere & Company, Moline, Ill.

[22] Filed: Nov. 10, 1972

[21] Appl. No.: 305,475

[52] U.S. Cl. ............................. 56/320.2, 56/202
[51] Int. Cl. ....................................... A01d 35/26
[58] Field of Search .................. 56/320.2, 202, 17.4

[56] References Cited
UNITED STATES PATENTS

| | | | |
|---|---|---|---|
| 3,568,421 | 3/1971 | Smith | 56/202 X |
| 3,721,078 | 3/1973 | Haffner | 56/202 |
| 2,973,614 | 3/1961 | Horner et al. | 56/202 X |
| 3,706,190 | 12/1972 | Taub | 56/202 X |
| 3,192,692 | 7/1965 | Slemmons | 56/202 X |

Primary Examiner—Russell R. Kinsey
Assistant Examiner—J. N. Eskovitz

[57] ABSTRACT

A rotary lawn mower includes a housing defining a discharge chute, the latter including a hinged outer portion in the form of a deflector or guard. The deflector is biased toward a lowered operative position wherein it acts to intercept and deflect objects thrown at a high trajectory by the mower blade, the deflector also acting to evenly disperse grass cuttings over the ground. The deflector may optionally be raised to an inoperative position wherein it permits a bagging attachment to be installed.

12 Claims, 10 Drawing Figures

MOWER DISCHARGE CHUTE DEFLECTOR AND BAGGING ATTACHMENT

BACKGROUND OF THE INVENTION

The present invention relates to a rotary mower and more particularly relates to a mower having a discharge chute readily changeable between a first mode for dispersing clippings upon the ground and a second mode for permitting a bagging attachment to be secured thereto.

The prior art includes lawn mowers which are constructed so as to be optionally used with or without an attachment for bagging clippings. These known mowers are not entirely satisfactory since they have relatively complicated structures for permitting the optional mounting of bagging attachments and/or are not easily changeable between bagging and non-bagging modes, and/or are unsafe when used without a bagging attachment since no means are provided for deflecting discharge material, including hard objects thrown by their cutting blades, toward the ground. Additionally, some of the mowers which do have deflectors are unsatisfactory since the discharged material is windrowed by the deflector thus leaving unsightly rows across the mowed areas.

SUMMARY OF THE INVENTION

Accordingly, it is a broad object of the invention to provide a rotary lawn mower which includes a relatively simple discharge chute structure which is easily convertible between operating modes with and without a bagging attachment, the structure including a deflector operative in a non-bagging mode to direct hard objects toward the ground while at the same time dispersing the clippings evenly over the mowed area. More specifically, it is an object to provide a bagging attachment which is easily connectible and disconnectible to the discharge chute structure without the use of any tools.

Another specific object is to provide a discharge chute including a hinged outer portion defining a deflector or guard shaped for scattering clippings as well as for deflecting hard objects thrown by the mower blade.

Another object is to provide a deflector which is mounted so as to accommodate easy installation of the bagging attachment. More specifically, it is an object to provide a bagging attachment having a handle which props the deflector in an inoperative position when the bagging attachment is installed, the handle having a forward extension forming a latch-engaging member which passes beneath the deflector and releasably engages a spring latch fixed to the top of the housing.

Another object is to provide an extended chute at the mower discharge opening with length sufficient to prevent the cutting blade from striking a foot which might accidentally be inserted into it.

Another object is to provide an extended chute which provides the above safety feature but which is also pivoted at its inner end thus permitting it to be raised, thereby reducing the overall width of the mower for transport (when attached to a vehicle) in the bed of a pickup truck, passing through a narrow gate or for storage in limited space.

Yet another object is to provide a deflector hinge structure which is located entirely exteriorly of the discharge chute so as not to disturb the flow of material therethrough.

These and other objects will become apparent from the ensuing description and the appended drawings.

DESCRIPTION OF THE PREFERRED EMBODIMENT

Figure 1:
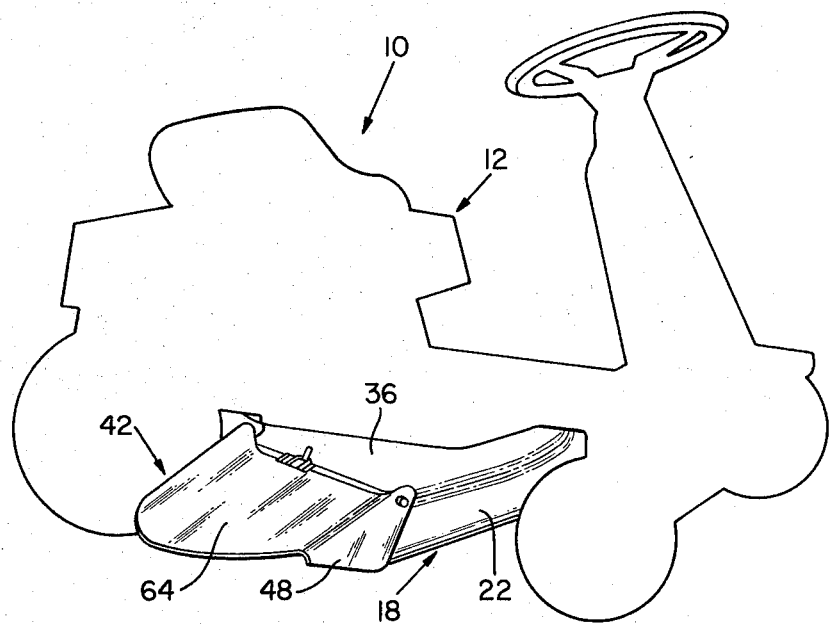
FIG. 1 is a perspective view, partially in outline, of a rotary lawn mower showing the mower in its non-bagging mode.

Referring now to the drawings, therein is disclosed a rotary mower here depicted as a riding mower and indicated in its entirety by the reference numeral 10. The mower 10 comprises a mobile vehicle 12, shown here only in outline, having an engine (not shown) arranged to drive a cutter blade 14 (FIG. 6) about a vertical axis in a generally horizontal plane through means of a drive shaft 16.

It is to be noted that hereinafter the terms "inner," "inwardly," "outer" and "outwardly" will be used and are made with reference to the axis of the shaft 16 and also the terms "front," "forwardly," "rear" and "rearwardly" are used with reference to the normal direction of travel of the vehicle 10.

Figure 6:
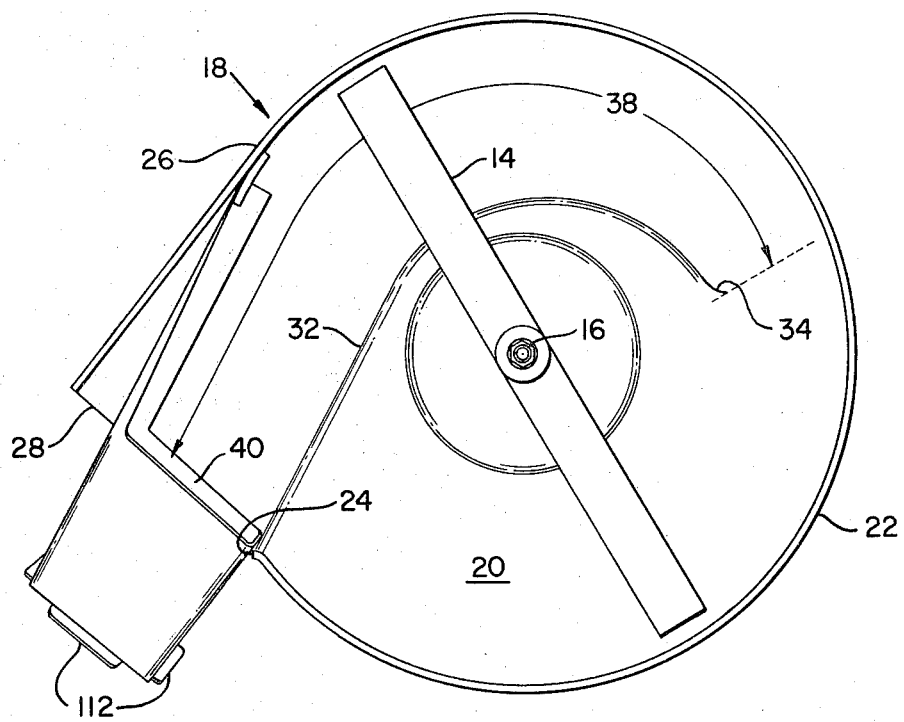
FIG. 6 is a bottom plan view of the mower housing showing the collecting spout of the bagging attachment installed.

A mower blade housing 18 is arranged about the blade 14 and includes a top or deck 20 which is integral with a vertical skirt 22, the top 20 overlying the blade 14 and rotatably supporting the shaft 16 and the skirt 22 extending circularly about the path traced by the tips of the blade 14 between a first skirt end 24 which terminates at a location at about 8 o'clock relative to the axis of rotation of the blade as viewed in FIG. 6 and an intermediate location 26 between 10 and 11 o'clock from where the skirt extends tangentially to a second skirt end 28 located at about 9 o'clock. Terminating coextensively with the second skirt end 28 is the outer terminal end 30 of an upwardly extending wall 32 formed in the housing top 20, the wall 32 being spaced inwardly from the skirt and having an inner end 34 positioned at about 3 o'clock. The wall 32 gradually diverges from the skirt, and has a top edge which gradually inclines upwardly, throughout the length of the wall from its inner to its outer end. The skirt 22 and a top portion 36 are similarly inclined and cooperate with the wall 32 to form an inner discharge chute portion 38 of a conventional design which is inverted U-shaped in transverse cross section and includes a discharge opening 40.

Figure 4:
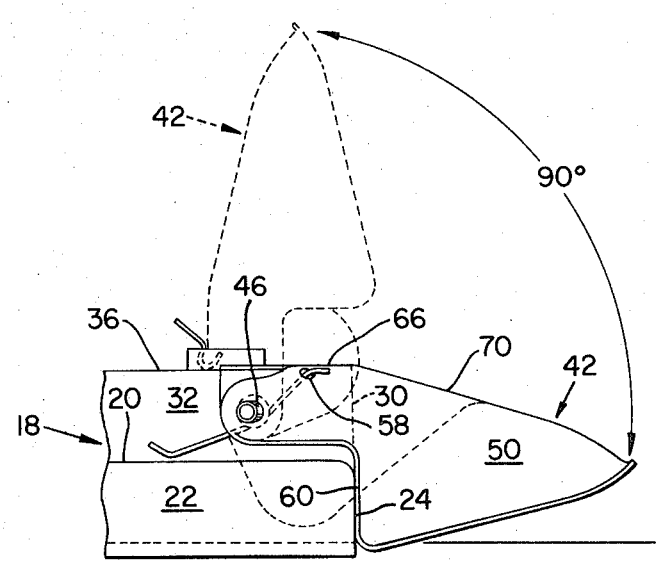
FIG. 4 is an elevational view of the housing portion shown in FIG. 3.
Figure 5:
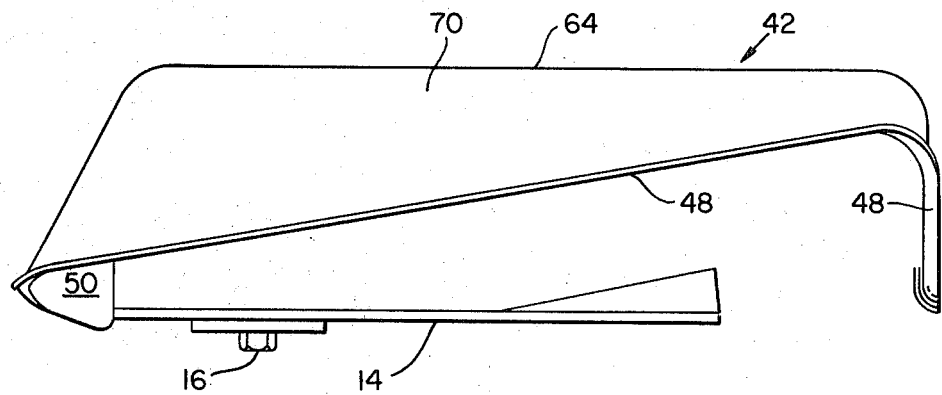
FIG. 5 is an elevational view of the deflector member showing the angular relationship of the inclined outer edge of the deflector member relative to the plane of rotation of the mower blade.

A deflector or guard 42 defines an outer discharge chute portion which forms a continuation of the inner discharge chute portion 38, the deflector also being inverted U-shaped in transverse cross section. Located exteriorly of the inner discharge chute portion 38 and respectively fixed at the same level to the upper outward corners of the skirt 22 and wall 32, adjacent the respective ends 24 and 30 of the skirt and wall, are a pair of oppositely projecting pins 44 and 46, the pin 44 being threaded for a purpose to be explained below. The deflector 42 is dimensioned such that the inner end thereof embraces the outer marginal end portion of the inner discharge chute portion 38, the deflector including front and rear walls 48 and 50, respectively, the upper rear corners of the walls 48 and 50 respectively forming inwardly extending ears 52 and 54 having apertures therein respectively receiving the pins 44 and 46. The pins 44 and 46 are here shown in axial misalignment; however, the aperture in the ear 54 is large enough to permit the deflector 22 to swing about the axis of the pin 46 through 90° between lowered and raised operative and inoperative positions respectively shown in solid and dashed lines in FIG. 4. The ear 54 is angled away from the wall 50 so as to define a space at the location whereat the pin 46 projects therethrough, the space receiving a torsion coil spring 56 disposed on the pin 46 and having one end projecting through a hole 58 in the upper corner of the ear 54 and having its other end in engagement with the housing top 20. The spring 56 is arranged so as to bias the deflector 42 downwardly towards its operative position. The downward movement of the deflector 42 is limited by an abutment surface 60 formed along the bottom edge of the wall 50 and disposed vertically in bearing relationship with the skirt 22 when the deflector is in its operative position. It is here noted that the spring 56 acts together with a nut 62 received on the pin 46 for securing the deflector 42 in place. Thus, it will be appreciated that the deflector hinge structure is located so as to in no way impede the passage of material through the discharge chute defined by the inner chute portion 38 and the deflector 42.

The deflector 42 includes a top wall 64 which includes an inner marginal strip 66 extending across its width and disposed horizontally above and in embracing relationship with the portion 36 of the housing top 20 when the deflector is in its operative position. Located centrally in the strip 66 is an inwardly opening notch 68 having a purpose to be described below. The deflector top wall includes a portion 70 which in the embodiment disclosed is inclined downwardly at an angle of between 15° and 17° relative to the horizontal. The wall portion 70 terminates in an outer peripheral edge 72 which generally approximates the curvature of a line drawn at a fixed radius from the drive shaft axis of rotation. The edge 72 is inclined downwardly from its forward to its rearward end and makes an angle of approximately 10° with the horizontal. The inclination of the top wall portion 70 and the peripheral edge 72 cooperate to define a contour which acts to produce even grass clipping distribution by directing clippings flowing through the forward portion of the deflector to a distance no greater than the cutting width of the blade 14 from the blade while directing clippings flowing through the remainder of the deflector, proceeding rearwardly from the forward portion, to the ground at progressively shorter distances away from the cutting blade. The contour of the deflector 42 is also such that hard objects arriving at the deflector on a high trajectory will be intercepted and directed downwardly towards the ground within a short distance of the mower.

Figure 2:
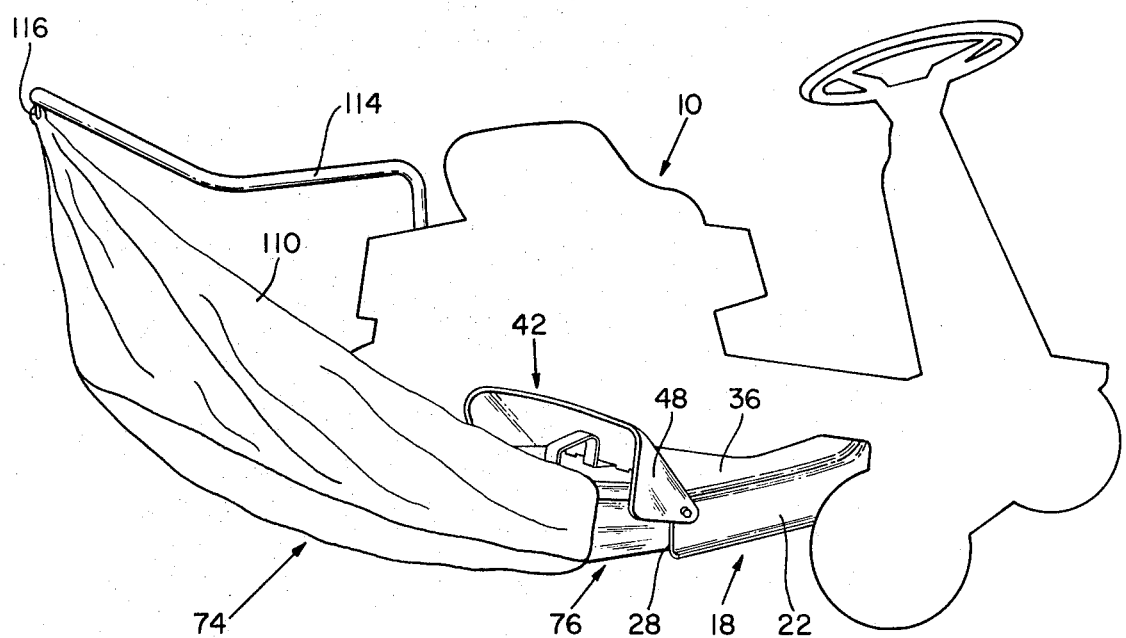
FIG. 2 is a view similar to FIG. 1 but showing the lawn mower in its bagging mode.
Figure 3:
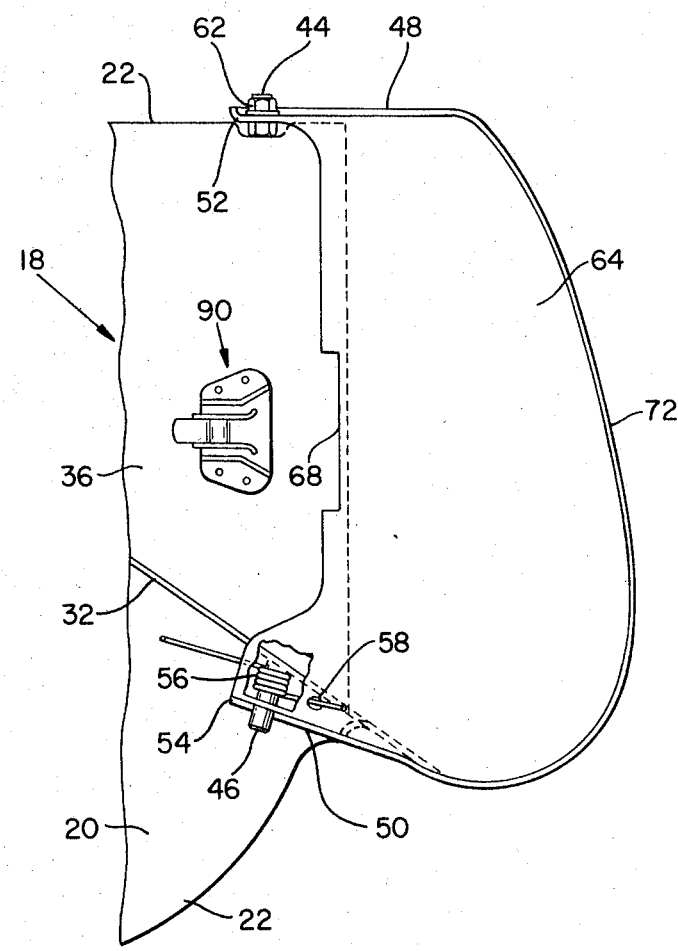
FIG. 3 is a partial top plan view of the mower housing showing the discharge end portion of the discharge chute including the hinged deflector.

Referring now to FIG. 2, therein is shown a bagging attachment 74 which is installed on the mower shown in FIG. 1 so as to convert the latter from a non-bagging to a bagging mode. The bagging attachment 74 includes a collecting spout 76 including a main tubular section 78 of substantially rectangular cross section comprising top, bottom, front and rear walls 80, 82, 84 and 86, respectively. The front and rear walls 84 and 86 are not spaced as far apart as the housing skirt and wall ends 24 and 30 and the inner end of the section 78 fits inside the outlet of the inner discharge chute portion 38 with the top and rear walls 80 and 86 respectively being in engagement with the housing top wall portion 36 and the wall 32. A baffle section 88 is fixed to and forms a continuation of the front wall 84 on the collecting spout tubular section 78, the baffle section extending generally parallel to the wall 32 and intersecting the skirt 22 adjacent the tangent point 26. The baffle section 88 thus blocks material from flowing through the forward portion of the inner discharge chute portion 38.

Figure 7:
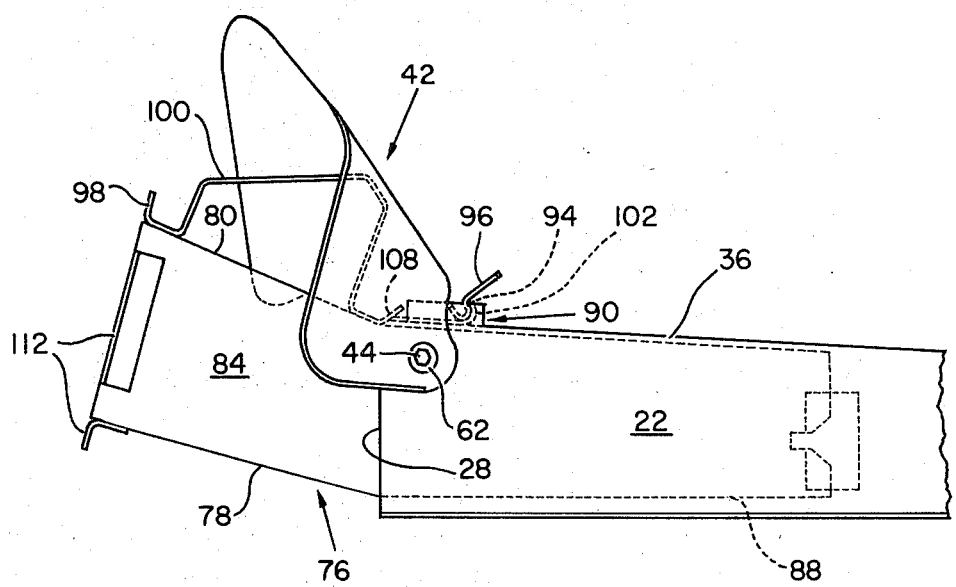
FIG. 7 is a partial side elevational view of the housing and collecting spout shown in FIG. 6.
Figure 8:
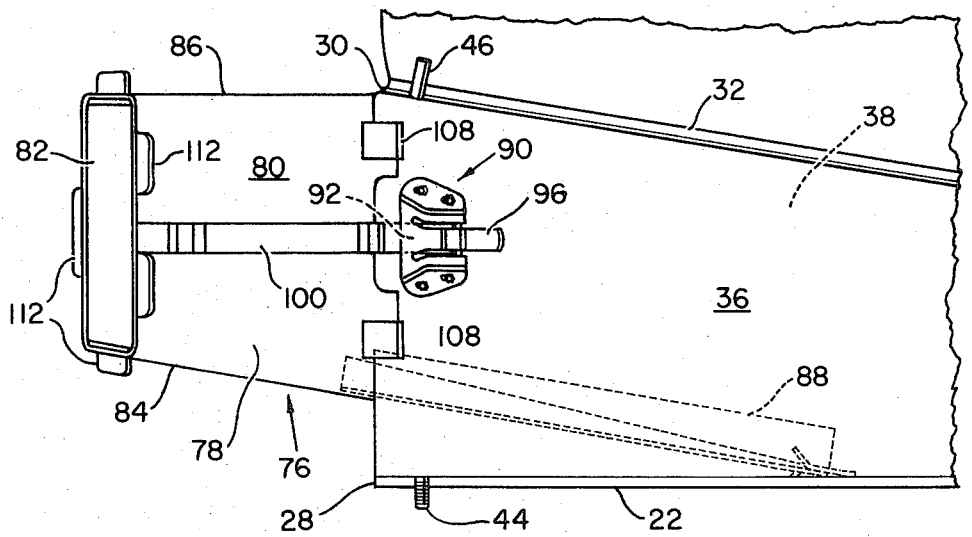
FIG. 8 is a top plan view of the housing and collecting spout shown in FIG. 7.
Figure 9:
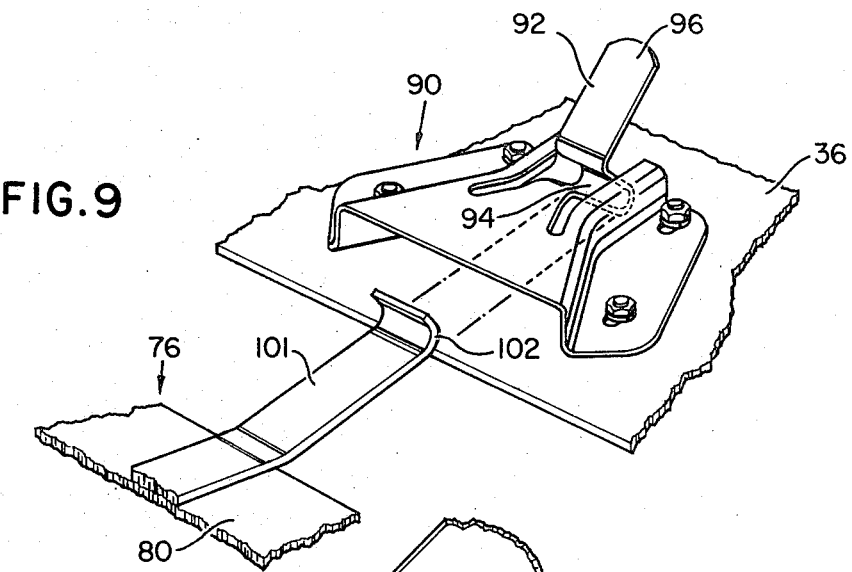
FIG. 9 is an enlarged perspective view showing the interlocking structure for releasably latching the collecting spout to the mower housing.
Figure 10:
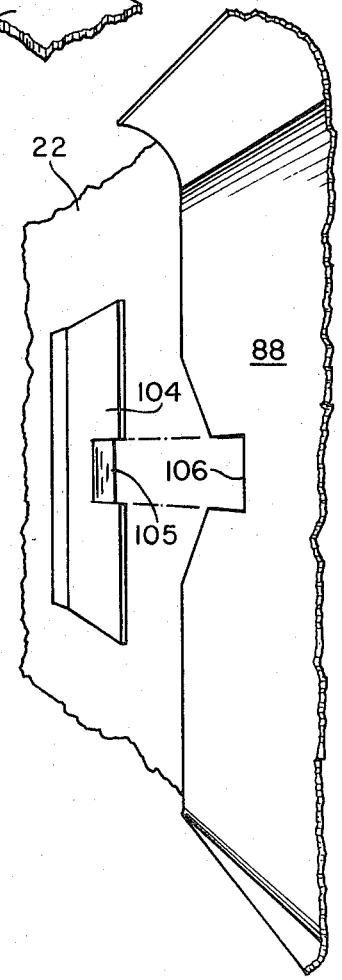
FIG. 10 is an enlarged perspective view showing additional interengaging structure which cooperates with that shown in FIG. 9 for holding the collecting spout in place during its use.

The collecting spout 76 is held in place by latching means including a channel-shaped spring metal bracket 90 fixed to the top portion 36 of the housing adjacent the discharge opening 40 so as to define an open ended opening 80 with the top portion 36. The top of the bracket 90 includes an inwardly extending elongate latching tab 92 bent so as to define a downwardly and inwardly inclined central U-shaped latching portion 94 biased downwardly, by virtue of the bend, into bearing engagement with the housing top portion 36 and having an inward leg terminating in an upwardly and inwardly inclined finger engageable portion 96. Fixed along the length of the top wall 80 of the spout 76 is a strap including an upwardly projecting end 98 at the discharge end of the spout, an intermediate inverted U-shaped portion forming a handle 100 and an end portion 101 extending inwardly beyond the inlet end of the spout and having a reversely bent latching portion 102 which is shaped complementary to the bottom of a latching portion of the latching tab 94 and is holdingly engaged thereby when the spout 76 is installed as illustrated in FIGS. 7 and 8. The latching interengagement of the latching portions 94 and 102 may be released by manipulating the tab 92 upwardly by pressing on the finger engageable portion 96. The spout 76 is further supported by means of an outwardly extending tab 104 which is fixed to the skirt 22 at the tangent point 26. The tab 104 includes a central part 105 that is bent back into engagement with the skirt 22 and is received in a complementary-shaped slot 106 in the inner end of the baffle section 88. Additionally, a pair of tabs 108 are fixed to the top wall 80 of the spout at locations on opposite sides of the handle 100 and extend inwardly so as to engage the marginal top edge portion of the inner discharge chute portion 38, as shown in FIG. 8. Thus, it will be appreciated that the spout 76 is releasably fixed to the mower housing without the use of fasteners requiring tools for the installation or removal of the spout.

It is here noted that the handle 100 serves the additional purpose of propping the deflector 22 in its inoperative position when the spout 36 is installed.

The bagging attachment 74 further includes a bag 110 which is mounted for receiving clippings from the collecting spout 76 through means of a plurality of flange sections 112 which are fixed to and extend transversely to the discharge end portion of the spout in the same plane containing the end 98 of the strap, the open end of the bag having an elastic band or drawstring or the like extending thereabout and disposable inwardly of the flange sections 98 and 112 so as to prevent the removal of the bag. The outer closed end of the bag 110 is supported in general alignment with the discharge opening of the spout 76 by means of an arm 114 which has one end fixed to the vehicle 10 and its other end releasably connected, as at 116, to the bag.

The operation of the mower 10 is as follows. With the mower in the non-bagging mode shown in FIG. 1, cut crop such as lawn grass or the like will be expelled from the housing via the inner discharge chute portion 38 and the deflector 42. As the clippings exit from the inner discharge chute portion, many will be directly deflected downwardly and/or will be carried in an airstream deflected downwardly by the deflector 42. The contour of the deflector acts to cause the clippings exiting nearest the forward portion of the deflector to be directed to the ground at a distance from the cutting blade which is approximately that of the width of cut of the mower while clippings exiting from the deflector at points progressively closer to the rear of the deflector are directed to the ground at progressively closer distances from the blade. Thus, the clippings are dispersed evenly over the ground. The velocity of the airstream is often great enough to bury the clippings in the standing grass so that a clean appearance is obtained.

Should a hard object be engaged by the blade 14 and impelled thereby through the inner discharge chute portion at a high trajectory, the deflector 42 will intercept the object and direct it toward the ground.

As the mower traverses the ground, uneven locations may be encountered resulting in the deflector 42 coming into contact with the ground. If this should occur, the hinge mounting of the deflector 42 will permit it to ride upon the ground thus preventing damage to the deflector. Once the uneven location is passed, the torsion spring 56 will return the deflector to its working position.

Should it be desired to bag grass clippings, the mower may easily be converted from its non-bagging mode, shown in FIG. 1, to its bagging mode, shown in FIG. 2, by installation of the collecting spout 76 and the bag 110. The collecting spout 76 may be easily installed without the use of any tools by first grasping the handle 100 in one hand while lifting the deflector 42 with the other hand. The spout 76 is then positioned to align the latching portion 102 thereof with the latching portion 94 of the spring metal bracket 90 while at the same time disposing the baffle section 88 so that the notch 106 is positioned to receive the tab 104. The spout 76 is then thrust inwardly to move the latching portion 102 beneath the latching portion 94 to the position shown in FIGS. 7 and 8. The interengagement of the latching portions 94 and 102 will then prevent the spout from moving outwardly. At this time, the spout will also be supported by the tab 104 and the tabs 108. The deflector 42 may then be released whereupon it will move downwardly into engagement with the handle 100. The bag 110 is then secured in place to complete the changing of the mower to the bagging mode.

If it is then desired to change the mower back to the non-bagging mode, the bag 110 and the spout 76 need only to be removed, the removal of the spout 76 being accomplished by pressing upwardly on the finger engageable portion 96 of the latching tab 92 with one hand to disengage the latching portion 94 from the latching portion 102 while at the same time pulling the spout outwardly with the other hand.

It will be appreciated then that the deflector 42 and the spout 76 cooperate to define a mower structure which is easily changeable between bagging and non-bagging modes, with the deflector further having the attributes of contributing to the safety of the operation of the mower in the non-bagging mode while at the same time acting to disperse grass clippings evenly over the ground.

While the present invention has been described in conjunction with a mower having only a single blade, it is to be understood that the deflector and bagging attachment may be used with multiple blade rotary mowers as well.

We claim:

1. In a rotary mower of the type including a rotary cutting blade means for traversing a planar cutting zone having a predetermined width considered relative to a normal direction of travel of the mower, a housing supporting said blade means and including a top overlying the cutting zone and integral with a depending skirt bordering the periphery of the zone, and an inner discharge chute portion which is inverted U-shaped in transverse cross section and is defined by top and opposite side walls of the housing for guiding clippings upwardly from the cutting zone through one side of the housing, an improved deflector for directing hard objects, impelled upwardly at a high trajectory through the discharge chute, toward the ground adjacent the exterior of the housing, comprising: an outer discharge chute portion having a top and opposite side walls conforming generally to the transverse cross section of the inner discharge chute portion and being mounted on the housing so as to form a general continuation of the inner discharge chute portion; the outer discharge chute portion having a top inclined downwardly away from the housing, and said top having an outer peripheral edge inclined downwardly from the front to the rear of the mower, the inclination of the top being related to the normal flow of material from the inner discharge chute portion such that grass clippings will be dispersed substantially evenly over a deposit zone extending transversely from and having a width approximately the same as that of said cutting zone; said top and opposite side walls of the outer discharge chute portion including inner end portions, considered relative to the cutting zone, embracing outer end portions of the inner discharge chute portion; said side walls of the outer discharge chute portion having upper inner corner portions defining inwardly extending ears having axially aligned apertures therein; a pair of pins being fixed to and extending transversely to and oppositely from upper outer corner portions of the inner discharge chute portion and being respectively received in the apertures in said ears; at least one of said pins defining a generally horizontal pivot axis about which the outer discharge chute portion is vertically pivotable between a lowered operative position and a raised inoperative position; and spring means biasing said outer discharge chute portion toward said operative position.

2. The mower defined in claim 1 wherein one of said ears is offset transversely outwardly from the inner discharge chute portion at the location whereat the pin extends through the aperture in the ear so as to define a clearance space; and said spring means being a coil torsion spring received on the last-mentioned pin and having one end located in an aperture in said outer deflector portion and having a second end bearing on the mower housing.

3. A lawn mower including an optionally attachable clipping collecting spout, comprising: a rotary cutting blade means for traversing a planar cutting zone; an open bottom blade housing overlying the blade and including a skirt portion surrounding a major portion of said cutting zone; said housing defining a discharge chute portion having top and opposite side walls terminating at a discharge outlet; said collecting spout including a main tubular portion having a top and at least one side wall which, when the spout is installed, are positioned in embracing relationship respectively with the inside surface of the top and one side wall of said discharge chute portion; fastening means for releasably retaining the spout in its installed position including a downwardly biased first latching member means fixed to the top of the discharge chute portion and being biased toward engagement therewith and a cooperating second latching member means being fixed to the top of the tubular portion of said spout and being located beneath the first latching member means; said first and second latching member means respectively having first and second latching surface portions which are interengaged when the spout is installed and said first latching member means being movable away from the second latching means to release the latter.

4. The lawn mower defined in claim 3 wherein the securing means further includes a pair of tabs fixed to the top of the tubular portion of the collecting spout at opposite sides of the second latching member means, said tabs being engaged with the outer top surface of the discharge chute portion when the spout is installed.

5. The lawn mower defined in claim 3 wherein said main tubular portion of the spout includes a second side wall which is spaced opposite said one side wall a distance less than the distance between the side walls of said discharge chute portions; said latter side walls having relatively straight portions diverging from each other in the direction of the discharge outlet; and a baffle section being secured to and forming an inwardly extending extension of said second side wall and extending generally parallel to said one side wall of said discharge chute portion and intersecting the other of said side walls of the discharge chute section.

6. The lawn mower defined in claim 5 wherein the fastening means includes a tab fixed to and projecting towards the discharge outlet from the other of said side walls of the discharge chute section at the location whereat the baffle section intersects the other of said side walls, and said baffle section having an inner end defining a slot which receives said tab when the spout is installed.

7. The mower defined in claim 3 wherein said first latching member includes a channel-shaped spring metal bracket having a web and opposite sides, the bracket being mounted with the sides in engagement with the top of the discharge chute portion and extending generally parallel to the one side thereof to thereby provide a passage extending between the web and the last-named top; said web including a tab-like portion having an outward secured end and an inner free end, the tab being bent downwardly and having a U-shaped portion defining a latching surface normally biasingly engaging the top of the discharge chute portion in line with said passage when the spout is disengaged, said second latching member means including a strap fixed to the top of the spout tubular portion and having an inner end projecting forwardly of the spout and having a latching surface positionable beneath and releasably engageable with the latching surface of the first latching member means.

8. The mower defined in claim 7 wherein said strap includes an intermediate portion forming a handle.

9. The mower defined in claim 8 wherein said spout includes flange means at the outward end of the tubular section over which the open end of a collecting bag is adapted to be received; and said strap including an outer end forming a portion of said flange means.

10. A lawn mower of the type optionally changeable between bagging and non-bagging modes, comprising: a mower blade means for traversing a generally planar cutting zone having a predetermined width as considered in the normal direction of travel; a mower blade housing defining an inner discharge chute portion having a discharge outlet through which cut material is discharged; an outer discharge chute portion having an inner end shaped to conform to the inner discharge chute portion at said outlet, said outer discharge chute portion being vertically pivotally mounted on said inner discharge chute portion for movement between a lower operative position wherein it forms a general continuation of the inner discharge chute portion and a raised inoperative position wherein it is clear of the discharge outlet; said outer discharge chute portion including surface means which is contoured such that, when the outer discharge chute portion is in its operative position, the surface means directs clippings emanating from the discharge outlet in substantially even dispersement over a discharge zone extending transversely to the normal direction at distance no greater than the predetermined width of the cutting zone from the latter, and intercepts hard objects, emanating from the discharge outlet at a steep trajectory, and deflects the objects toward the ground; a bagging attachment optionally installable to receive clippings from said discharge outlet when the outer discharge chute portion is in its inoperative position; said bagging attachment including a collecting spout comprising a main tubular portion including an end to an installed position within the inner discharge chute portion through said discharge outlet, the spout being configured relative to the inner discharge chute portion for directing the cuttings normally exiting through said outlet to exit through said tubular portion; said outer discharge chute portion being mounted and configured such that when it is in its inoperative position the top thereof is spaced above the top of the inner discharge chute portion; a releasable latch means for securing the spout in place and including a first latching member means fixed to the top of the inner discharge chute portion adjacent the discharge opening of the latter and including a first latching portion biased toward bearing engagement with the top of the inner discharge chute portion, and a second latching member means fixed to the top of the outer discharge chute portion and including a second latching portion extending beyond said tubular section and which is insertable into the discharge outlet; said second latching position including a seating surface positionable below and engageable by said first latching portion when said spout is in an installed position.

11. The mower defined in claim 10 wherein said second latching member means is a strap fixed along the length of said tubular portion of said spout; and said strap forming a handle which engages and props up the outer discharge chute portion to hold the latter in its inoperative position when the spout is in its installed position.

12. The mower defined in claim 10 wherein said spout is further supported, when in its operative position, from said inner discharge chute portion by means of a pair of tabs fixed to the top of the tubular portion at opposite sides of the second latching member means and project upwardly therefrom toward the inner discharge chute portion; and said tabs engaging the exterior of the inner chute portion.

* * * * *